United States Patent
Chen et al.

(10) Patent No.: US 6,616,358 B1
(45) Date of Patent: Sep. 9, 2003

(54) KEYBOARD STRUCTURE ALTERATION METHOD

(75) Inventors: Kun-Huei Chen, Taipei Hsieng (TW); Shun-Ping Wang, Taipei Hsieng (TW)

(73) Assignee: Inventec Appliances Corporation, Taipei Hsieng (TW)

( * ) Notice: Subject to any disclaimer, the term of this patent is extended or adjusted under 35 U.S.C. 154(b) by 0 days.

(21) Appl. No.: 10/201,941

(22) Filed: Jul. 25, 2002

(51) Int. Cl.[7] .................................................. B41J 5/28
(52) U.S. Cl. ........................................ 400/472; 400/490
(58) Field of Search ................................. 400/472, 490

(56) References Cited

U.S. PATENT DOCUMENTS

| | | | | |
|---|---|---|---|---|
| 6,004,049 A | * | 12/1999 | Knox | 400/89 |
| 6,301,626 B1 | * | 10/2001 | Knox | 710/10 |
| 2002/0021287 A1 | * | 2/2002 | Tomasi et al. | 345/168 |
| 2002/0041270 A1 | * | 4/2002 | Chiu et al. | 345/168 |
| 2002/0061217 A1 | * | 5/2002 | Hillman et al. | 400/489 |
| 2002/0171633 A1 | * | 11/2002 | Brinjes | 345/168 |

FOREIGN PATENT DOCUMENTS

| | | | | |
|---|---|---|---|---|
| JP | 59160225 A1 | * | 9/1984 | G06F/3/02 |
| JP | 61157924 A1 | * | 7/1986 | G06F/3/023 |

\* cited by examiner

*Primary Examiner*—Charles H. Nolan, Jr.
(74) *Attorney, Agent, or Firm*—Bacon & Thomas, PLLC

(57) ABSTRACT

A changeable keyboard arrangement includes a database established in the memory of an electronic device, with a minimum of one or more keyboard layout code-page tables stored in the database such that the user can change to a different keyboard layout on the electronic device, and after selecting the key configuration of the keyboard to be changed from a keyboard layout set-up menu, the CPU of the electronic device reads numbers from the key code-page table stored beforehand in the memory; as such, when the user changes a keyboard layout and presses various keys, the CPU searches for the corresponding numbers in the code-page tables based on the first signal issued by the contacts of the keys within a unit interval and then executes the relevant processing.

5 Claims, 2 Drawing Sheets

KEYBOARD STRUCTURE ALTERATION METHOD

BACKGROUND OF THE INVENTION

1) Field of the Invention

The invention herein relates to a changeable keyboard arrangement.

2) Description of the Prior Art

A conventional keyboard has a plurality of built-in keys, each key capable of inputting a corresponding signal such that alphanumeric characters (symbols) or on-screen cursor movement instructions are inputted as the user presses the said keys. However, the key layout of the said conventional keyboard is permanent and unchangeable after production. Since the arrangement of the said keys cannot be altered, users feel extremely inconvenienced when utilizing certain software. For example, when a child uses the said keyboard the first time to run an educational software application, the overly numerous keys easily causes learning phobia and results in a dislike of computer study. Or, a user operating game software only requires the up arrow, down arrow, left arrow, right arrow, and enter keys, but since the surface area of the said keys is small and, furthermore, they are packed into a corner of the said keyboard, pressing keys is awkward. Therefore, if a changeable key arrangement is developed that enables the quantity and position of the said key arrangement to support specific software applications and, furthermore, enlarge the surface area of the keys to allow easier pressing by the user, such a breakthrough would be welcomed by users.

SUMMARY OF THE INVENTION

The objective of the invention herein is to provide a changeable keyboard arrangement including a keyboard and a database established in the memory of an electronic device, with a minimum of one or more keyboard layout code-page tables stored in the said database such that the user can change to a different keyboard layout on the said electronic device, and after selecting the key configuration of the said keyboard to be changed from a keyboard layout set-up menu, the CPU of the said electronic device reads numbers from the said key code-page table stored beforehand in the said memory; as such, when the user changes the keyboard and presses various keys, the said CPU searches for the corresponding numbers in the code-page tables based on the first signal issued by the said key contacts with a unit interval and then executes the relevant processing, thereby enabling the user to alter the keyboard layout of the said electronic device as deemed necessary to suit personal requirements and support specific software.

DETAILED DESCRIPTION OF THE INVENTION

Figure 2:
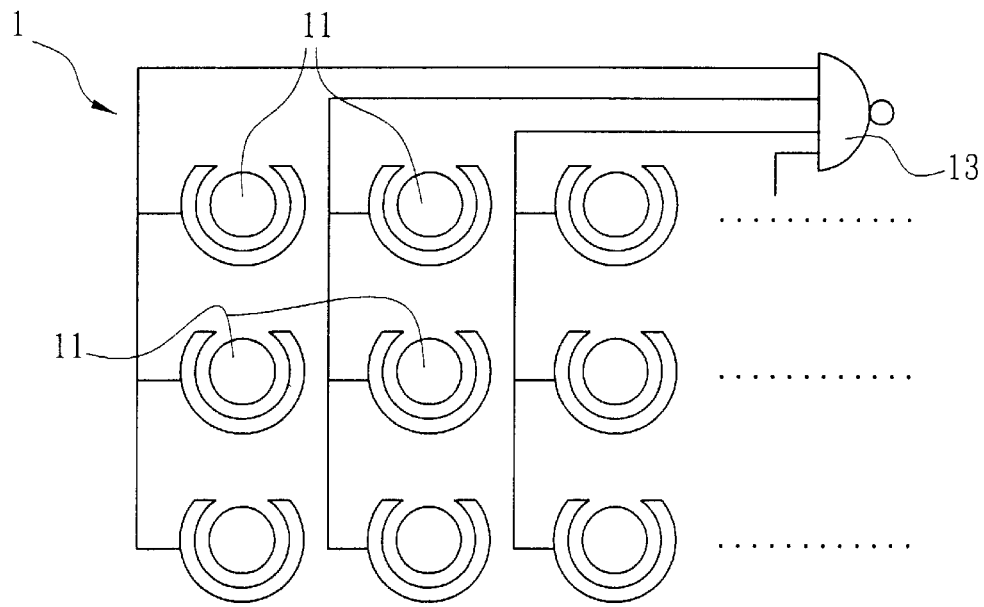
FIG. 2 is a schematic drawing of a keyboard circuit.
Figure 3:
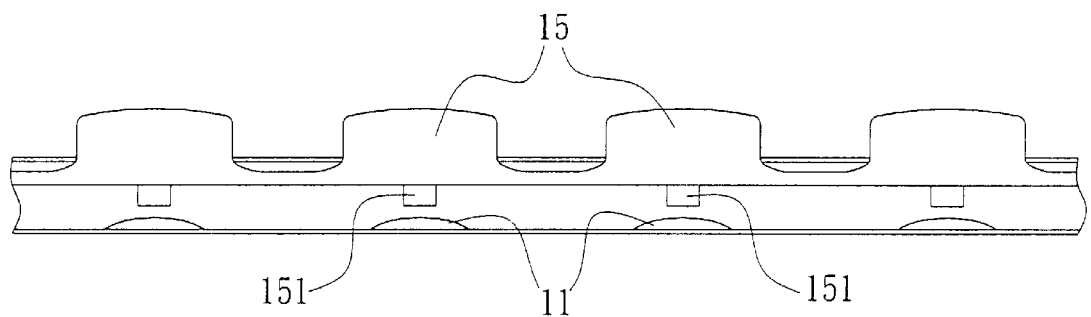
FIG. 3 is a cross-sectional drawing of the invention herein.

The invention herein is a changeable keyboard arrangement. Referring, to FIG. 2, the circuit of the said keyboard 1 has a plurality of contacts 11 arrayed in rows, with the said contacts 11 each connected via a conductor to a NAND gate circuit and the opposite end of the said NAND gate circuit 13 connected to the microprocessor of said keyboard 1, enabling the said microprocessor to scan the said contacts 11 for close or open states and acquire signals of electric potential, including a first signal issued by said key contacts. Referring to FIG. 3, a key 15 is disposed at the upper extent of each said contact 11, the said key 15 having at its bottom surface a junction element 151 that is aligned with a said contact 11 such that when any of the said keys 15 are pressed, the function element 151 of the said key 15 becomes in contact with a said contact 11, and the contact 11 causes a circuit closure that produces an electric potential. The said microprocessor then scans the electric potential signal produced by the circuit closure of the said contact 11 and transfers the said signal to the central processing unit (CPU) of an electronic device (such as a personal digital assistant and personal computer, etc.), enabling the said CPU to read a code-page table of keys 15 and their corresponding numbers, and then find the corresponding numbers in the said code-page table.

Figure 4:
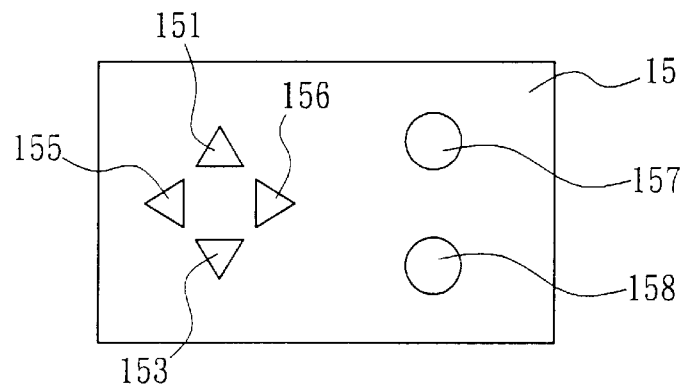
FIG. 4 is a drawing of a keyboard key configuration embodiment of the invention herein.

In the invention herein, referring to FIG. 3 and FIG. 4, each said key 15 is capable of operating as an upward movement key 151, a downward movement key 153, a leftward movement key 155, a rightward movement key 156, a function key 157, and an enter key 158 to support utilization with game software. However, the positions and dimensions of the said upward movement key 151, downward movement key 153, leftward movement key 155, rightward movement key 156, function key 157, and enter key 158 differ from the position and dimensions of an original key 15 and, furthermore, the quantity and positions of the said contacts 11 being touched by the said key 15 differ from that of the contacts 11 of the original key 15. Therefore, if the said code-page table remains constant and is not modified, this would result in erroneous number searches in the said code-page table by the said CPU. For example, the position of the contact 11 on the original upward movement key 151 represents the character A in the original code-page table and so utilizing the said original code-page table produces the input of the letter A, an error that is not the upward movement of the cursor desired by the user. Therefore, in addition to providing for the different configuration of keys 15, the invention herein establishes a plurality of different arrangement key 15 code-page tables in a memory-resident database.

In the most preferred embodiment of the invention herein, a database is established in the memory of the said electronic device, with a minimum of one or more keyboard layout code-page tables stored in the said database such that the user can change to a different keyboard 1 layout on the said electronic device, and after selecting the key arrangement of the said keyboard 1 to be changed from a keyboard layout set-up menu, the CPU of the said electronic device reads numbers from the said key code-page table stored beforehand in the said memory; as such, when the user changes a keyboard 1 and presses various keys 15, the said CPU searches for the corresponding numbers in the code-page tables based on the first signal issued by the said key 15 contacts 11 within a unit interval and then executes the relevant processing.

In the said embodiment, a said key 15 must touch a said contact 11 a minimum of one unit interval before the keyboard 1 microprocessor scans for the signal produced by the circuit closure of a said contact 11, with the surface area of each said key 15 accommodating a plurality of contacts 11 such that when the user presses a said key 15, the said key 15 touches each of the said contacts 11 or touches a few of the contacts 11 of the said plurality of contacts 11 and, furthermore, the said contacts 11 are assigned an identical number in the said code-page tables, therefore, whether all or several of the said contacts 11 are touched, the said CPU reads the first signal issued by the said contacts 11 within a unit interval and searches for the correct, corresponding number in the said code-page tables.

In the said embodiment, when altering the keyboard 1 keys 15 of the said electronic device, the power supply of the said electronic device must first be switched off in order to execute the keyboard 1 key 15 change of the said electronic device, following which the power supply of the said electronic device is switched back on and the keyboard 1 key 15 layout for the said electronic device is entered through the set-up menu of the said electronic device, thereby enabling usage of the altered keyboard 1 keys 15.

Figure 1:
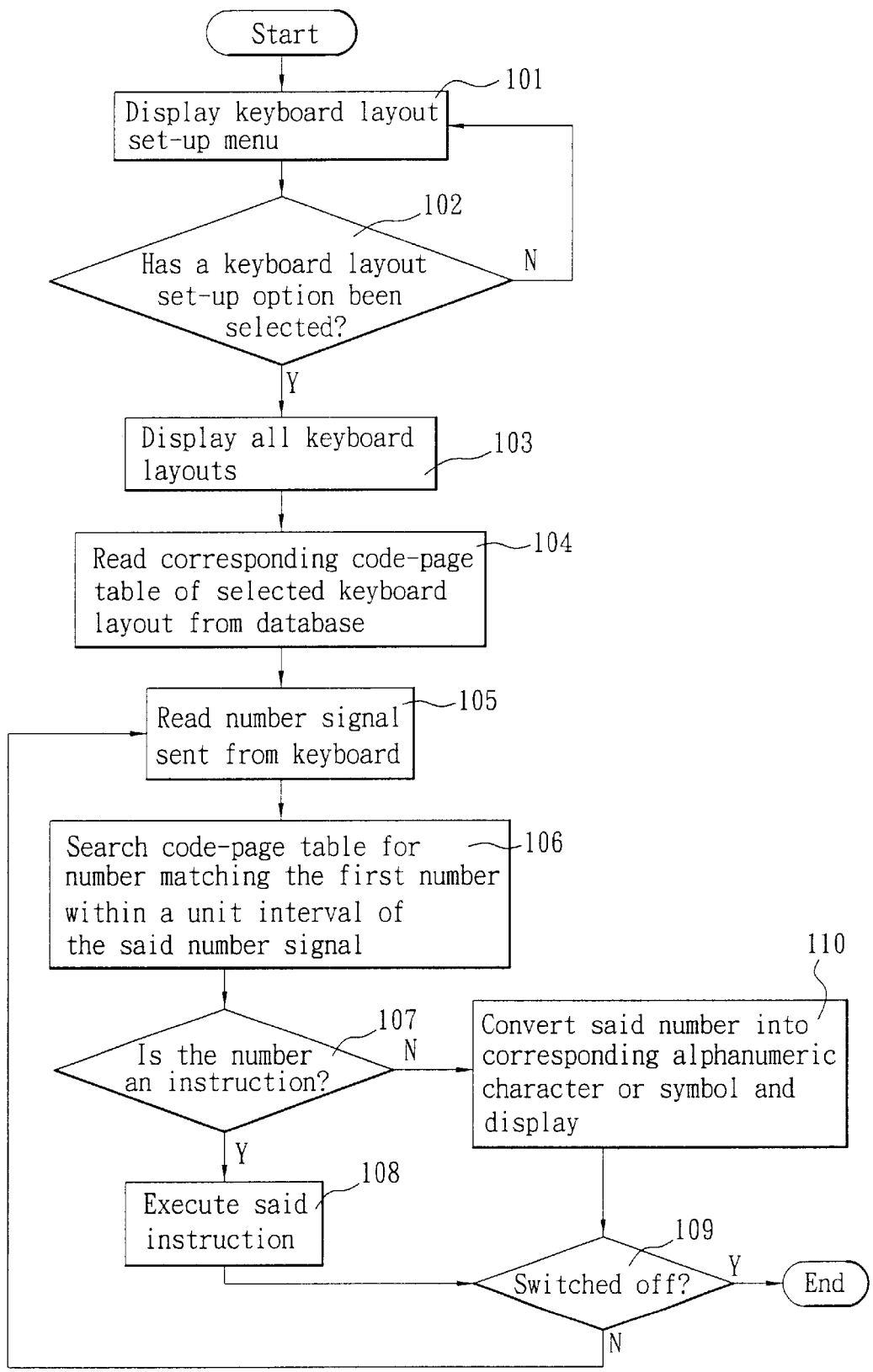
FIG. 1 is a flowchart of the invention herein.

In the said embodiment, referring to FIG. 1, when the user alters the keyboard keys of the said electronic device, a choice is selected from the set-up menu of the said electronic device, wherein the CPU executes processing according to the following procedures:

(101) First, a keyboard layout set-up menu appears on the display of the said electronic device to provide for user selection.

(102) It is determined whether a said keyboard layout set-up option has been selected. If so, the next procedure is executed. Otherwise, the procedure continues on to the execution of step (101).

(103) Various keyboard layouts are listed on the display of the said electronic device for selection by the user.

(104) Based on the keyboard layout that was selected, the corresponding key number code-page table is read from the database stored beforehand in the memory of the said electronic device.

(105) Signals sent from the keyboard are read.

(106) Based on the first signal within a unit interval among the said sent signals, the said code-page table is searched to find the matching numbers.

(107) A determination is made as to whether a said number is an instruction. If so, the procedure continues on to the next step. Otherwise, step (110) is executed.

(108) The said instruction is executed according to the content of the said instruction.

(109) A determination is made as to whether the said electronic device has been switched off. If so, the routine is ended. Otherwise, the procedure continues on to the execution of step (105).

(110) The said number is converted into a corresponding alphanumeric character (or symbol), the said alphanumeric character (or symbol) is shown on the display of the said electronic device, and then step (109) is re-executed.

As such, the user changes the keyboard layout of the said electronic device as deemed necessary to suit personal requirements and support specific software.

While the invention has been described by means of specific embodiments, numerous modifications and variations could be made thereto by those skilled in the art without departing from the scope and spirit of the invention set forth in the claims.

What is claimed is:

1. A changeable keyboard arrangement comprising:

a database established in a memory of an electronic device, with a minimum of one or more keyboard layout code-page tables stored in said database to permit select of different keyboard layouts on said electronic device from a keyboard layout set-up menu, a CPU of said electronic device being arranged to read numbers from said key code-page table stored beforehand in said memory; wherein when said keyboard layout is changed and various keys thereof are pressed, said CPU searches for the corresponding numbers in the code-page tables based on first signals issued by contacts of said keys within a unit interval and then executes a relevant processing; and a keyboard including a circuit composed of a plurality of said contacts arrayed in rows, with said contacts each being connected via a conductor to a NAND gate circuit, and an opposite end of said NAND gate circuit being connected to the microprocessor such that the microprocessor scans the contacts for closed or open states and acquires said contacts signals issued by the contacts of said keys.

2. A changeable keyboard arrangement as claimed in claim 1 in which when said CPU determines that one of said numbers is an instruction, said instruction is executed according to a content of said instruction.

3. A changeable keyboard arrangement as claimed in claim 1 in which when said CPU determines that one of said numbers represents an alphanumeric character, said one of said numbers is converted into said alphanumeric character and said alphanumeric character is shown on a display of said electronic device.

4. A changeable keyboard arrangement as claimed in claim 1 in which said electronic device is a personal digital assistant.

5. A changeable keyboard arrangement as claimed in claim 1 in which said electronic device is a personal computer.

* * * * *